United States Patent

Chiou

[11] Patent Number: 6,147,018
[45] Date of Patent: Nov. 14, 2000

[54] HYBRID PROTECTIVE COMPOSITE

[75] Inventor: Minshon J. Chiou, Chesterfield, Va.

[73] Assignee: E. I. du Pont de Nemours and Company, Wilmington, Del.

[21] Appl. No.: 09/162,591

[22] Filed: Sep. 29, 1998

[51] Int. Cl.[7] .................................................. F41H 5/04
[52] U.S. Cl. ..................... 442/243; 428/911; 442/134; 442/135; 442/239; 442/241; 2/2.5
[58] Field of Search ........................... 428/911; 442/135, 442/134, 241, 243, 239; 2/2.5

[56] References Cited

U.S. PATENT DOCUMENTS

| | | | |
|---|---|---|---|
| 5,085,945 | 2/1992 | Yun et al. ................................. | 428/614 |
| 5,187,003 | 2/1993 | Pfister et al. ............................ | 428/36.1 |
| 5,619,748 | 4/1997 | Nelson et al. ................................ | 2/2.5 |
| 5,622,771 | 4/1997 | Chiou et al. ............................. | 428/219 |
| 5,677,029 | 10/1997 | Prevorsek et al. ....................... | 428/113 |
| 5,789,327 | 8/1998 | Rousseau ................................. | 442/135 |
| 5,918,309 | 7/1999 | Bachner, Jr. ................................. | 2/2.5 |
| 5,926,842 | 7/1999 | Price et al. .................................... | 2/2.5 |
| 5,958,804 | 9/1999 | Brown, Jr. et al. ...................... | 442/192 |
| 6,022,601 | 2/2000 | Pfister et al. ............................ | 428/36.1 |

FOREIGN PATENT DOCUMENTS

| | | | |
|---|---|---|---|
| 7-292137 | 11/1995 | Japan | C08J 5/24 |
| 8-27633 | 1/1996 | Japan | D01F 6/74 |
| 9-72697 | 3/1997 | Japan | F41H 1/02 |
| 2198628 | 6/1988 | United Kingdom | F41H 1/02 |
| 2198824 | 6/1988 | United Kingdom | F41H 1/00 |
| 2238460 | 6/1991 | United Kingdom | F41H 1/02 |
| 92/14608 | 9/1992 | WIPO | B32B 27/02 |
| 93/20400 | 10/1993 | WIPO | F41H 5/04 |

*Primary Examiner*—Terrel Morris
*Assistant Examiner*—Arti R. Singh

[57] ABSTRACT

A composite is disclosed which is resistant to knife stab penetration and is made from at least one layer of woven polybenzoxazole or polybenzothiazole fibers and at least one layer of a fiber network of another polymer.

8 Claims, 1 Drawing Sheet

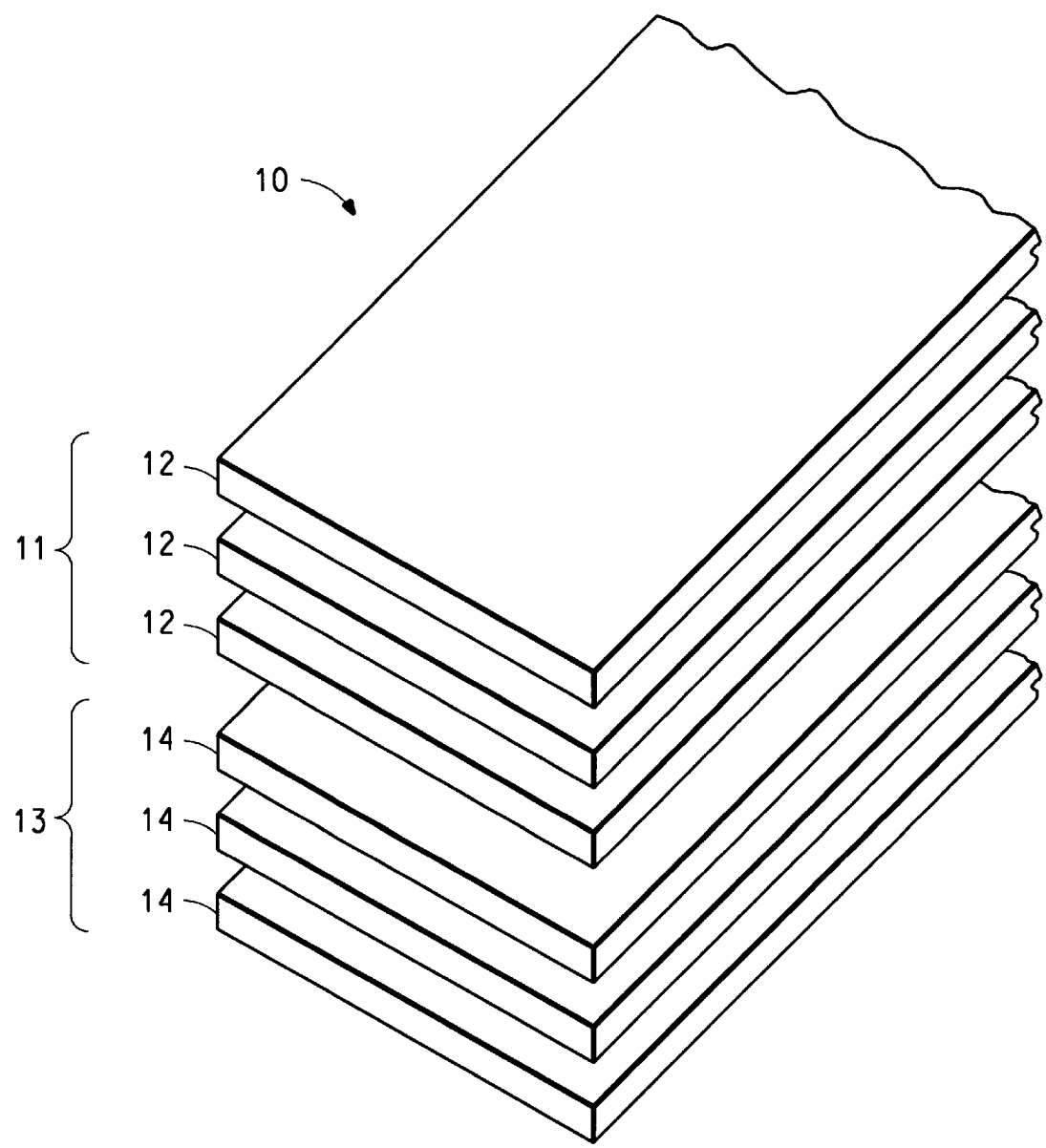
FIGURE

HYBRID PROTECTIVE COMPOSITE

BACKGROUND OF THE INVENTION

1. Field of the Invention

This invention relates to protective composites in the field of knife stab resistance which composites provide, on one hand, greater protection for a given weight; and, on the other hand, equivalent protection in a lighter weight, in comparison with other protective composites currently available. The composite of this invention is flexible and, also, provides good protection against ballistic threats.

2. Description of the Prior Art

International Publication WO 93/20400, published Oct. 14, 1993, discloses the use of polybenzoxazole and polybenzothiazole fibers in ballistic resistant articles.

SUMMARY OF THE INVENTION

The present invention provides a protective composite structure with at least one layer of woven fabric comprising polybenzoxazole (PBO) or polybenzothiazole (PBT) fibers and at least one layer of a network of fibers of other polymeric material. The other polymeric material can be, among other things, polyamide and polyolefin.

BRIEF DESCRIPTION OF THE DRAWINGS

The FIG. shows an expanded perspective view of a composite of this invention.

DETAILED DESCRIPTION

Improvements in composites for knife stab protection are continually sought, although often as a secondary quality after ballistic protection. Generally, knife stab protection is required in garments worn by guards, police officers, and the like; and ballistic protection is, also, a desirable quality in such garments. Such garments must be as flexible as possible to ensure comfort sufficient that the garment will be readily worn.

The hybrid composite combination of materials of this invention exhibits increased flexibility because it requires less total material to obtain a level of stab protection which is equivalent with the same amount of only a single material to achieve the same degree of protection. Alternatively, the hybrid composite combination of materials of this invention can be assembled to afford increased stab protection using a total amount of material which is equivalent with the amount required when using only a single material in the composite.

The materials of this hybrid composite are polybenzoxazole or polybenzothiazole in one section of at least one layer and another polymer in the other section of at least one layer.

Polybenzoxazole and polybenzothiazole are generally, as described in the aforementioned WO 93/20400, incorporated herein by reference. Polybenzoxazole and polybenzothiazole are preferably made up of mers of the following structures:

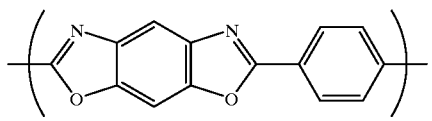

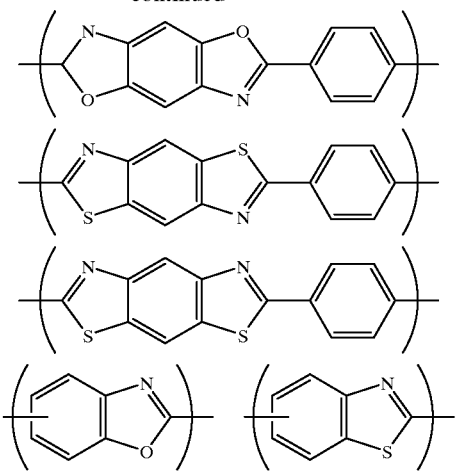

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 mer units. Preparation of the polymers and spinning of those polymers is disclosed in the aforementioned International Publication WO 93/20400.

The other polymeric material can be, generally, any material which yields fibers having a tenacity of at least 10 grams per dtex and an initial modulus of at least 160 grams per dtex. The preferred material for the other polymeric material is polyamide, polyolefin, polyvinyl alcohol, polyacrylonitrile, and the like. The preferred polyamide is aramid, especially, para-aramid. Other polyamides include aliphatic polyamides such as nylon 66, aliphatic-aromatic polyamides, aromatic-heterocyclic polyamides, and the like. The preferred polyolefins are polyethylene or polypropylene, especially linear, so-called extended chain polyethylene or polypropylene. Other polyolefins include polybutylene, polymethyl-1-pentene, and the like.

The present invention provides a protective composite structure with a section of at least one layer of woven fabric comprising polybenzoxazole or polybenzothiazole fibers and a section of at least one layer of a network of fibers of other polymeric material.

The polybenzoxazole and polybenzothiazole fibers are woven in any, generally-used, fabric configuration such as plain weave, crowfoot weave, basket weave, satin weave, and the like. Plain weave is preferred.

It is believed that fibers and yarns of any linear density will be effective to increase stab resistance in the present invention. The preferred linear density for individual filaments should be 0.3 to 17 dtex, and 0.5 to 3.5 dtex is most preferred. Yarns in the range of 100 to 3300 dtex are preferred with 220 to 1700 dtex being most preferred. Yarns with a linear density of greater than 3300 dtex are generally more difficult to produce and use efficiently and yarns with a linear density of less than 100 dtex are difficult to weave without damage to the yarn.

When the other polymer is polyamide, aramid is preferred. By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

The preferred aramid is a para-aramid and poly(p-phenylene terephthalamide)(PPD-T) is the preferred para-aramid. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichlorot-erephthaloyl chloride or 3,4'-diaminodiphenylether.

When the other polymer is polyolefin, polyethylene or polypropylene are preferred. By polyethylene is meant a predominantly linear polyethylene material of preferably more than one million molecular weight that may contain minor amounts of chain branching or comonomers not exceeding 5 modifying units per 100 main chain carbon atoms, and that may also contain admixed therewith not more than about 50 weight percent of one or more polymeric additives such as alkene-1-polymers, in particular low density polyethylene, propylene, and the like, or low molecular weight additives such as anti-oxidants, lubricants, ultraviolet screening agents, colorants and the like which are commonly incorporated. Such is commonly known as extended chain polyethylene (ECPE). Similarly, polypropylene is a predominantly linear polypropylene material of preferably more than one million molecular weight. High molecular weight linear polyolefin fibers are commercially available. Preparation of polyolefin fibers is discussed in U.S. Pat. No. 4,457,985.

In the composite of this invention, the other polymer is present as a network of fibers. The network may be a woven, knitted, or non-woven structure; and, by non-woven, is meant unidirectional (if contained within a matrix resin), felted, and the like. By woven is meant any generally-used, fabric weave such as plain weave, crowfoot weave, basket weave, satin weave, and the like.

The composite of this invention is a combination of a section of the polybenzoxazole or polybenzothiazole layers and a section of layers of the fiber network of other polymer. Generally, more than one layer of each of those materials is required to afford the desired stab protection. Each layer of polybenzoxazole and polybenzothiazole generally has an areal density of 75 to 450 grams per square meter and, generally, 1 to 15 layers are used. The areal density of the layers of fiber network depends greatly on the form of the network and on the kind and linear density of the fibers. Generally, however, the polybenzoxazole and polybenzothiazole fibers constitute from 10 to 90, and preferably 15 to 50, weight percent of the composite. The layers which form the sections of the composite can be joined such as by being sewn together or they can be stacked together and held, for example, in a fabric envelope. The layers which constitute each section are usually placed together and the composite can, thereby, be seen as a structure having two distinct sections of layers. The composite can, however, be constructed by intermixing the different layers in any way such that the sections are not distinct. The polybenzoxazole or polybenzothiazole fabric section can be combined with the fiber network section to yield layers of different materials in any sequence. For example, the composite can be made by alternating polybenzoxazole or polybenzothiazole layers with layers of the fiber network.

It has been found that the preferred arrangement of the sections in the composite for the best knife stab resistance has the layers of the polybenzoxazole or polybenzothiazole section all together and exposed to the knife stab while the layers of the fiber network section are located on the interior of the composite, away from the knife stab.

The FIG. shows the protective composite 10 of this invention with a section 11 of layers 12 of woven polybenzoxazole or polybenzothiazole and a section 13 of layers 14 of a network of fibers of other polymeric material. While the layers 12 and 14 can be intermixed in any sequence such that sections 11 and 13 are not distinct, it is preferred that the layers and the sections should be arranged substantially as shown with section 11 exposed to the knife stab and section 13 located away from the knife stab.

TEST METHODS

Linear Density. The linear density of a yarn is determined by weighing a known length of the yarn. "dtex" is defined as the weight, in grams, of 10,000 meters of the yarn.

In actual practice, the measured dtex of a yarn sample, test conditions, and sample identification are fed into a computer before the start of a test; the computer records the load-elongation curve of the yarn as it is broken and then calculates the properties.

Tensile Properties. Yarns tested for tensile properties are, first, conditioned and, then, twisted to a twist multiplier of 1.1. The twist multiplier (TM) of a yarn is defined as:

$$TM=(turns/cm)(dtex)^{1/2}/30.3$$

The yarns to be tested are conditioned at 25° C., 55% relative humidity for a minimum of 14 hours and the tensile tests are conducted at those conditions. Tenacity (breaking tenacity), elongation to break, and modulus are determined by breaking test yarns on an Instron tester (Instron Engineering Corp., Canton, Mass.).

Tenacity, elongation, and initial modulus, as defined in ASTM D2101-1985, are determined using yarn gage lengths of 25.4 cm and an elongation rate of 50% strain/minute. The modulus is calculated from the slope of the stress-strain curve at 1% strain and is equal to the stress in grams at 1% strain (absolute) times 100, divided by the test yarn linear density.

Penetration Resistance. Knife penetration resistance is determined on a sample to be tested using a boning knife (made by Russell Harrington Cutlery, Inc., Southbridge, Mass., U.S.A.) with a single edged blade 15 cm (6 inches) long and about 2 cm (0.8 inch) wide, tapering toward the tip and having a Rockwell hardness of C-55. The tests are conducted in accordance with HPW test TP-0400.03 (Nov. 28, 1994) from H. P. White Lab., Inc. The test samples, placed on a 10% gelatin backing, are impacted with the knife, weighted to 4.55 kilograms (10 pounds) and dropped from various heights until penetration of the sample of greater than 6mm under test conditions is accomplished. Results are reported as penetration energy (joules) by multiplying kilogram-meters, from the energy at the penetrating height, by 9.81.

EXAMPLES

Preparation of Layers.

Several different yarns were woven or made into layers of fabric or fibers and then made into composite structures on which to conduct stab resistance tests.

1. Plain weave fabric of 1560 denier (1733 dtex) polybenzoxazole yarn was made at 21×21 ends per inch (8.3×8.3 ends per centimeter) with an areal density of 0.47 pounds per square foot (2.3 kilograms per square meter). This yarn was available from Toyobo Co., Ltd. under the tradename of Zylon®.

2. Plain weave fabric of 400 denier (444 dtex) poly(p-phenylene terephthalamide) yarn was made at 31×31 ends per inch (12.2×12.2 ends per centimeter) with an areal density of 0.92 pounds per square foot (4.49 kilograms per square meter). This yarn was available from E. I. du Pont de Nemours and Company under the tradename of Kevlar®.

3. Plain weave fabric of 650 denier (722 dtex) polyethylene yarn was made at 35×35 ends per inch (13.8×13.8 ends per centimeter) with an areal density of 0.50 pounds per square foot (2.44 kilograms per square meter). This yarn was available from AlliedSignal, Inc. under the tradename of Spectra® 900.

4. Layers of unidirectional extended chain polyethylene fiber (UDECPE) crossplied in 0/90 degree orientation, sandwiched with polyethylene film, were used with an areal density of 0.51 pounds per square foot (2.49 kilograms per square meter). These layers were available, completely manufactured, from AlliedSignal, Inc. under the tradename of Spectra Shield Plus®

Example 1

Combinations of polybenzoxazole (PBO) layers with layers of the other polymers were assembled and tested for stab resistance; and the results were compared with structures of equivalent areal density made from polybenzoxazole alone or the other polymers alone. The results are set out below:

| Construction | Penetrations Energy (joules) | Areal Density (psf) | (kgsm) |
| --- | --- | --- | --- |
| 8 layers (PBO) plain 8.3 × 8.3 | 22.6 | 0.47 | 2.30 |
| 40 layers (PPDT) plain 12.2 × 12.2 | 18.1 | 0.92 | 4.49 |
| 12 layers (ECPE) plain 13.8 × 13.8 | 11.3 | 0.50 | 2.44 |

-continued

| Construction | Penetrations Energy (joules) | Areal Density (psf) | (kgsm) |
| --- | --- | --- | --- |
| 22 layers (UDECPE) | 20.3 | 0.51 | 2.49 |
| 8 layers (PBO) (T) 40 layers (PPDT) (B) | 67.8 | 1.39 | 6.79 |
| 40 layers (PPDT) (T) 8 layers (PBO) (B) | 61.0 | 1.39 | 6.79 |
| 8 layers (PBO) (T) 12 layers (ECPE) (B) | 76.8 | 0.97 | 4.74 |
| 12 layers (ECPE) (T) 8 layers (PBO) (B) | 50.8 | 0.97 | 4.74 |
| 8 layers (PBO) (T) 22 layers (UDEDPE) (B) | 74.6 | 0.98 | 4.78 |
| 22 layers (UDECPE) (T) 8 layers (PBO) (B) | 45.0 | 0.98 | 4.78 |

(T) denotes the top or knife stab face
(B) denotes the bottom or inner face

It is noted that the composite structures provide much higher penetration energy results than would be expected from a simple sum of the individual section elements of the combination. It is, also, noted that the penetration resistance is remarkably higher when the polybenzoxazole section is located on the top (exposed to the knife stab).

What is claimed is:

1. A protective composite structure comprising:

a.) At least one layer of woven fabric comprising polybenzoxazole or polybenzothiazole fibers, b.) At least one layer comprising a network of fibers of other polymeric material and wherein the composite has an areal density of less than 1.4 pounds per square foot (6.83 kilograms per square meter) with a penetration resistance of greater than 45 Joules.

2. A composite according to claim 1 wherein said network of fibers includes polyamide fibers.

3. A composite according to claim 2 wherein said polyamide fibers are para-aramid.

4. A composite according to claim 1 wherein said network of fibers includes polyolefin fibers.

5. A composite according to claim 4 wherein said polyolefin fibers are polyethylene.

6. A composite of claim 3 wherein the woven fabric is from 10 to 90 percent, by weight, of the composite.

7. A composite of claim 5 wherein the woven fabric is from 10 to 90 percent, by weight, of the composite.

8. A composite structure for protection against penetration from a knife stab comprising:

a.) A section, exposed to the knife stab, comprising at least one layer of woven fabric comprising polybenzoxazole or polybenzothiazole fibers, b.) A section, away from the knife stab, comprising at least one layer comprising a network of fibers of other polymeric materials, and wherein the composite has an areal density of less than 1.4 pounds per square foot (6.83 kilograms per square meter) with a penetration resistance of greater than 45 Joules.

* * * * *